Figure 7:
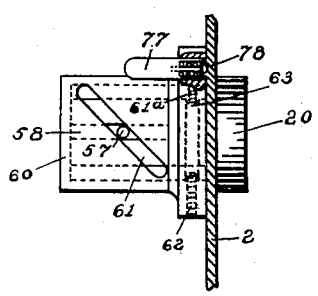

No. 865,613. PATENTED SEPT. 10, 1907.
F. SCHREIDT.
FISHING REEL.
APPLICATION FILED AUG. 4, 1906.
3 SHEETS—SHEET 1.
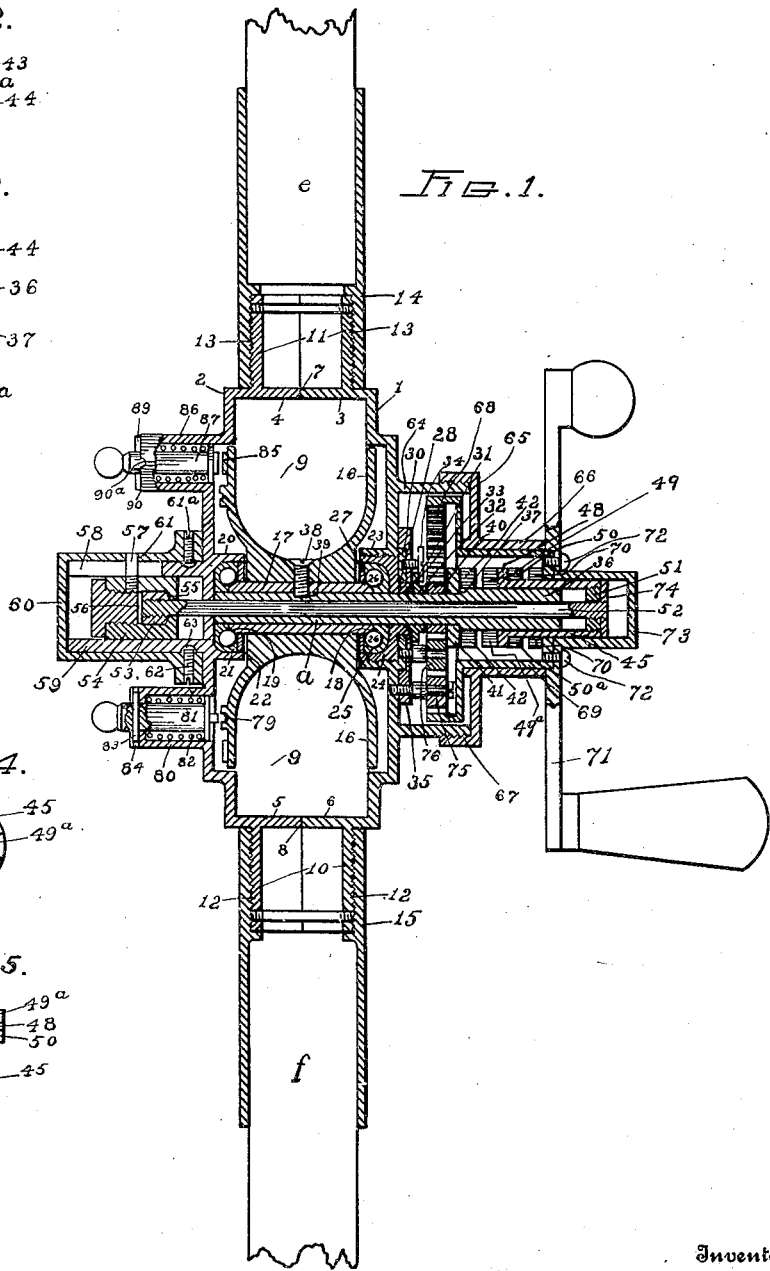

No. 865,613. PATENTED SEPT. 10, 1907.
F. SCHREIDT.
FISHING REEL.
APPLICATION FILED AUG. 4, 1906.

3 SHEETS—SHEET 2.

Witnesses
Fred A. Schlosser
David C. Davies

Inventor
Frank Schreidt
By John H. Boss
Attorney

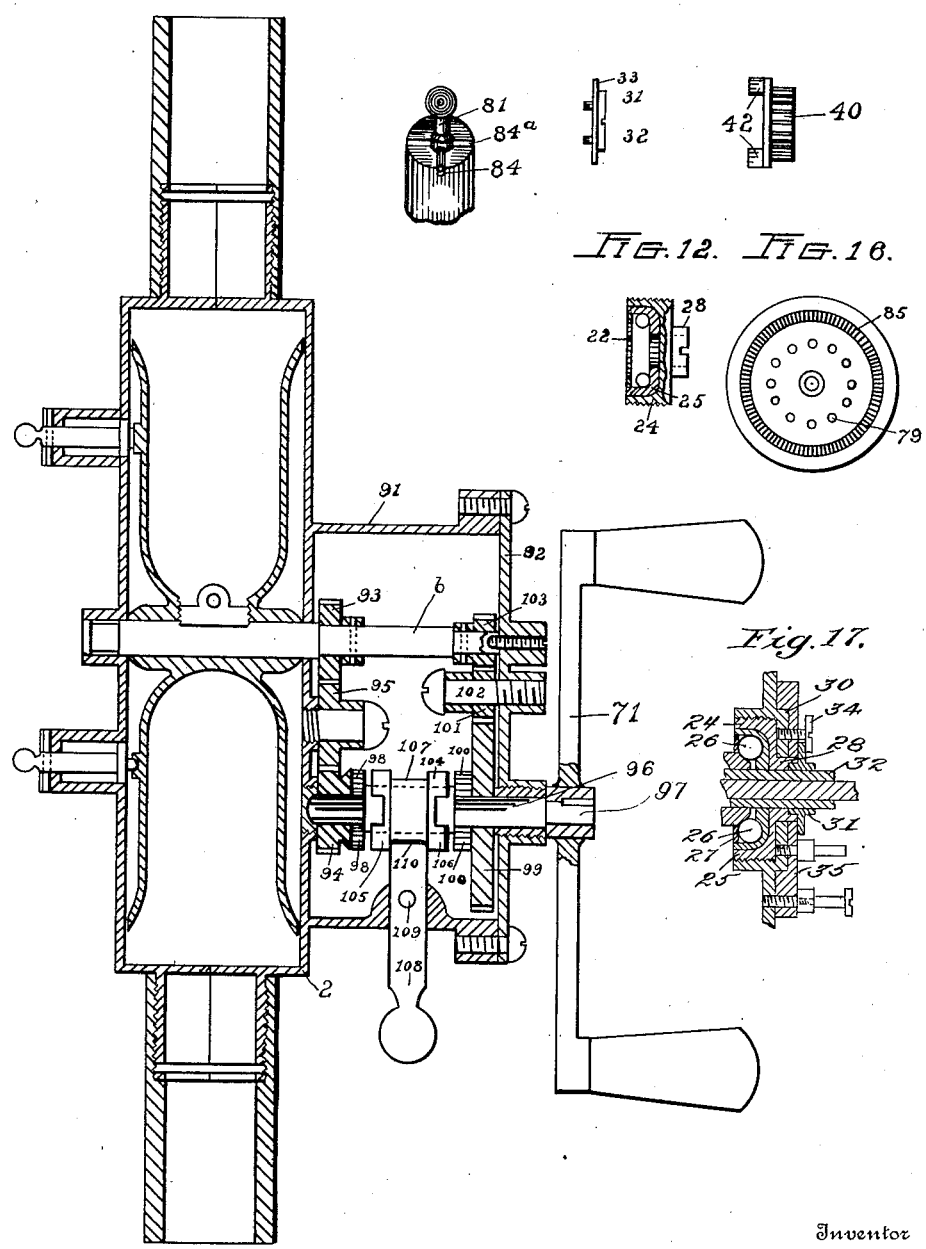

UNITED STATES PATENT OFFICE.

FRANK SCHREIDT, OF MANSFIELD, OHIO.

FISHING-REEL.

No. 865,613.  Specification of Letters Patent.  Patented Sept. 10, 1907.

Application filed August 4, 1906. Serial No. 329,160.

*To all whom it may concern:*

Be it known that I, FRANK SCHREIDT, a citizen of the United States, residing at Mansfield, in the county of Richland and State of Ohio, have invented certain new and useful Improvements in Fishing-Reels, of which the following is a specification.

My invention relates to that class of fishing reels in which facilities are provided for casting the line direct from the spool, and in which means are provided to increase or decrease the speed of the winding spool through suitable clutch mechanism.

It is well known that in order to provide an efficient and convenient fishing reel that a differential movement must be provided for the spool to permit of the proper and effectual handling of all sizes of fish. In order to do this properly it is necessary to increase or decrease the speed of the winding spool at the will of the operator without increasing the speed of the operating lever.

The objects of my improvements are therefore; first, to construct a fishing reel that will permit the casting of the fishing line from the winding spool journaled on ball bearings; second, to afford facilities for connecting the spool through suitable clutch mechanism to the operating lever to obtain a direct pull on the line; third, to provide an audible alarm to indicate when the fishing line is being drawn from the spool; fourth, to provide a suitable means for locking the spool.

The primary objects of my invention being to provide three separate and distinct movements or speeds for the spool, as follows to rotate the spool for casting purposes independent of the reel mechanism; to permit the fishing line to be wound on the spool by the application of direct power through the medium of the operating lever; and to increase the speed of the spool without increasing the speed of the operating handle through the medium of the suitable gearing at the will of the operator, preferably quadrupling the speed of the spool. I attain these and other objects by the mechanism illustrated in the accompanying drawing in which similar reference characters refer to similar parts throughout the several views.

Figure 8:
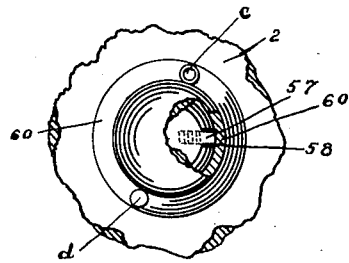
Figure 6:
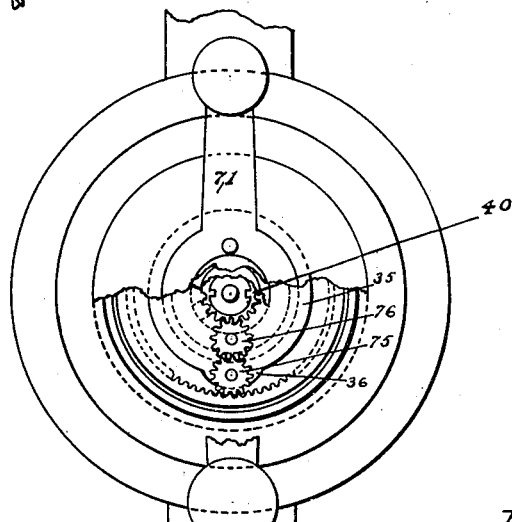
Figure 9:
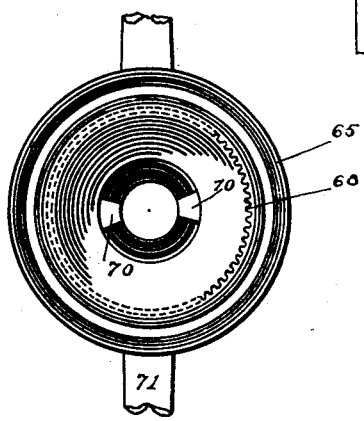
Figure 10:
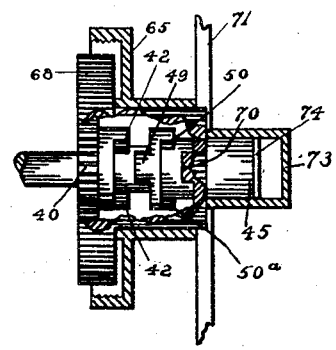

Figure 1 is a cross-sectional front elevation of my device showing a detail view of the operating mechanism. Fig. 2, an end elevation of tubular shaft. Fig. 3 is a vertical elevation of the tubular shaft. Fig. 4 is an end elevation of the sliding sleeve showing keys and clutch wings. Fig. 5 is a vertical elevation of the sliding sleeve. Fig. 6 is an end elevation of one side of the casing with a part broken away showing the mesh of the gearing. Fig. 7 is a longitudinal view of the cam, tubular projecting portion, and locking pin. Fig. 8 is an end view of the cam and projecting portion of the casing showing pin intersecting the slots. Fig. 9 is an end view of the internal gear showing wings formed thereon comprising part of the clutch mechanism. Fig. 10 is a side elevation of the tubular shaft, internal gear and clutch mechanism showing method of operation. Fig. 11, is a cross-sectional side elevation of a modification showing the detail of the operating mechanism. Fig. 12 is a cross-sectional side elevation of the ball bearing cage, race and washer. Fig. 13, is a side elevation of the combined pinion and clutch. Fig. 14 is a side elevation of the slotted washer used to adjust the ball bearings. Fig. 15 is a perspective view of the boss showing grooves. Fig. 16 is a side view of the spool showing rack and perforations. Fig. 17 is an enlarged cross-sectional front elevation of the ball bearing adjusting mechanism, gear plate, etc.

In the construction of my reel I employ a casing comprising two parts, 1 and 2.

The parts 1 and 2 have inwardly extending lugs 3—4—5 and 6 which contact with each other at the points 7 and 8 leaving a space (9) between them. The lugs have outwardly extending circular portions (10 & 11) made integral with the lugs forming part of the casing and bisected at the same points as the lugs.

The peripheries (12 & 13) of the circular portions (10 & 11) are exteriorly screw-threaded. Bushings (14 & 15) are provided and interiorly screw-threaded and adapted to engage with the screw-threaded peripheries of the circular portions (10 & 11) securing and rigidly retaining the parts together forming the casing and leaving the space (9) heretofore referred.

A spool (16) having an axis (17) with the ends (18 & 19) chamfered and extending on each side of the spool is fitted to a suitable aperture provided in the center of the axis. The part 2 of the casing has an inwardly extending circular portion (20) which is recessed, forming a cup or cage into which a ball-race (21) is fitted. The balls are retained in place through the medium of a kerfed washer (22). A similar inwardly projecting circular portion (23) is formed on the part 1. This circular portion is formed cup shape with the inner periphery screw-threaded and adapted to receive the ball-race cage (24) which is screw-threaded and engages with the inner periphery of the circular portion (23).

The cage (24) is recessed forming a cup into which the ball-race (25) is inserted for the purpose of forming a race for the balls (26) which are held in place by the kerfed washer (27). The ball-race cage (24) has a hub (28) made integral therewith, and extending outwardly from the cage into an annular washer (30) made integral with the casing.

The end of the hub (28) is slotted to provide for the insertion of a key wrench which provides a means of adjusting the ball-race cage (24) to and from the chamfered ends (18 & 19) of the shaft (17). The purpose of providing for this adjustment is to permit the spool, which is mounted on the shaft (17) to be journaled on ball bearings of the end thrust type and to afford facilities for the accurate adjustment of the bearings and to obviate friction.

In order to retain the ball cage casing in proper adjustment with reference to the bearing ends (18 & 19) of the shaft (17) I provide a washer (31) having an annular rib (32) made integral therewith. The washer is provided with lugs to fit the slots in the hub of the ball-race cage. The portion (33) of the washer extends beyond the aperture in the casing into which the hub (28) is fitted. The washer 31 is also provided with slots for the purpose of inserting a key-wrench which also provides a means of adjusting the ball-race cage in the same manner as described in adjusting it through the mediun of the hub. A set screw (34) with an enlarged head is fitted to a screw-threaded aperture provided in the gear plate (35) and is adapted to be screwed down until the enlarged head contacts with the flange (33) of the washer. This provides a means of retaining the ball-race cage in its place positively after being properly adjusted.

The gear plate (35) has the front portion recessed to fit the washer (30), and is formed with an arm (36ª) to provide a means of attaching suitable pinions thereto, the purpose of which will be described hereinafter.

A tubular shaft (a) having an enlarged portion (36) on one end forming a shoulder (37) is inserted in the aperture of the axis (17). The tubular shaft (a) is connected to the spool through the medium of the set screw (38) which passes through the hub of the spool and is brought in contact with a notch (39) formed in the shaft (a) thereby connecting the spool and shaft together and preventing lateral movement of the tubular shaft. A pinion (40) is loosely journaled on the shaft (a) and rotates between the annular rib (32) and the shoulder (37).

A washer (41) is made integral with the pinion and provided with outwardly extending lugs or wings (42), forming one half of a clutch. Two slots (43 & 44) are formed in the enlarged portion (36) of the shaft (a) at points diametrically opposed to each other. A sleeve (45) having keys (46 & 47) extending inwardly from the inner periphery is fitted to the enlarged end (36) of the shaft (a) the keys engaging the slots (43 & 44) so as to permit the sleeve to be connected to the shaft (a) and at the same time permitting the sleeve to be reciprocated or slidably adjusted on said shaft.

The end of the sleeve is provided with a washer (48) having double wings (49—49ª—50 & 50ª) extending from each side of the washer at points diametrically opposed to each other. The inner periphery of one end of the sleeve is screw-threaded to receive the washer 51. A shifting rod (52) is inserted in an aperture provided in the center of the tubular shaft (a) with its ends extending on each side of the casing.

The end of the rod is provided with an enlarged portion (53) made integral therewith or attached thereto. The enlarged portion (53) is fitted to the socket (54) and is rotatably held in place by the shoulder (55) of the socket and the end of the screw (56). To the upper portion of the socket (54) a cam pin (57) is securely attached and adapted to engage with the longitudinal slot (58) formed in the annular projecting portion (59) which is attached to or made integral with the part 2 of the casing. The socket (54) is journaled in the projecting portion (59) and is adapted to be slidably adjusted or reciprocated thereon.

A cam (60) is fitted to the outer periphery of the projecting portion (59) and is provided with an angular or inclined slot (61) which intersects with the slot (58). The pin (57) passes through the slots (58 & 61) so that when the cup (60) is rotated or partially rotated, the pin (57) is reciprocated in the projecting portion (59) through the medium of the angular slot (61) each side contacting with one side of the pin alternately according to the direction the cap is rotated in carrying the socket (54) and rod (52) with it.

The cap or cam (60) is held in place and in close contact with the part 2 of the casing by the screws (61ª & 62) which have their ends rounded and adapted to mesh with an annular groove (63) formed in the outer periphery of the projecting portion (59) adjacent to the outer face of the part 2 of the casing.

The opposite end of the rod (52) is screw-threaded and adapted to engage with a suitable screw-threaded aperture formed in the washer (51). When the cap or cam (60) is rotated reciprocating the cam pin (57), the sleeve (45) and clutch mechanism formed thereon is reciprocated upon the enlarged portion (36) of the tubular shaft (a).

The part 1 of the casing is provided with an annular cup shaped flange (64) with its outer periphery screw-threaded. The cap (65) having a hub (66) made integral therewith is provided, with the inner periphery of its annular flange (67) screw-threaded and adapted to engage with the outer periphery of the cup shaped projecting portion (64).

An internal gear (68) having a hub (69) made integral therewith is journaled to the inner periphery of the hub (66) of the cap. Wings or lugs (70) are formed on the inner periphery of one end of the hub of the internal gear at points diametrically opposed to each other and extending inwardly therefrom and adapted to engage with the clutch mechanism formed on the sleeve. The lugs of each providing means of engaging and disengaging each other as the sleeve is slidably adjusted upon the tubular shaft. An operating lever or crank (71) is secured to internal gear hub by the bolts (72) and provided with a circular projection (73) to support the sleeve (45) when it is slidably adjusted or reciprocated on the enlarged portion (36) of the shaft (a).

A jam-nut or washer (74) is provided to lock the shifting rod (52) to the sleeve (45) when it is properly adjusted. Two small pinions (75 & 76) are journaled to the gear plate (35) and engage with the pinion (40) and the internal gear (68) thereby providing a means of transmitting motion from the internal gear to the shaft (a) for the multiple speed. When the rod (52) is reciprocated through the medium of the cam pin (57) and the cap or cam (60), the sleeve (45) is reciprocated on the enlarged portion (36) of the shaft (a) engaging or disengaging the low and high speed mechanism transmitting speed to the spool or permitting independent rotation thereof.

In the operation of my device when the cam (60) is rotated in one direction thereby forcing the wings (50) to engage with the wings (70) provided in the hub of the internal gear a direct connection of the tubular shaft upon which the spool is mounted is made with the lever (71) and when said lever is rotated with the wings (70) and (50) engaged, the power is applied direct and the same speed or movement is transmitted to the spool that is imparted to the lever (71). When the cam (60) is rotated in the opposite direction forcing the sleeve 45 carrying the wings 49 and 49ª into engagement with the wings 42 made integral with the washer 41 and the lever 71 is rotated, movement is transmitted to the internal gear 68 and pinions 75, 76 & 40 by means of which the speed of the shaft (a) is multiplied without increasing the speed or rotation of said operating lever (71).

When it is desired to cast the line, the cap (60) is rotated until the pin (57) is at the center of its throw. This disengages the lugs or wings formed on the sleeve (45) and leaves it in its central position disengaged from the wings (70) formed on the hub of the internal gear and the wings (42) formed on the washer (41) thereby permitting the spool to rotate freely when the line is being cast independent of the high or low speed mechanism.

When the line is being cast the sleeve and clutch mechanism are held in their central position or throw by means of the spring actuated pin (77) which meshes with a notch (78) formed in the part 2 of the casing in the path of the pin. An annular series of perforation (79) are formed in the spool 16. A boss (80) projects from side of the part 2 and is provided with a spring actuated pin (81) having its end in the path of the perforations and adapted to register therewith. It will be observed that this is a great convenience in transporting the reel from place to place or when the line is not in use as it securely locks the spool and provides means of winding more or less of the fishing line on the spool at the will of the operator.

The pin is withdrawn from the apertures by compressing the spring (82) and is held either in or out of contact with perforations by the pin (83) which rests in slots (84 & 84ª) of different depths. In order to provide a means of giving an audible alarm when the fishing line is being drawn from the reel I form a modified rack (85) on the spool 16.

An outer projecting portion (86) is formed in the path of the rack and a pin (87) having a flattened end is inserted in a suitable aperture provided in the center of the projecting portion. The pin is held under spring tension and is brought in or out of contact with the modified rack (85) by pulling upward on the pin (87) and permitting the pin to be held in or out of contact by the pin (89) which rests in slots (90 and 90ª) of different depths formed at right angles with each other.

When the fishing line is being drawn from the spool the pin (87) is in contact with the rack and as the spool is rotated an audible alarm is given through the medium of the pin contacting with the rack.

Fig. 11 as shown, is a modification of my device. An elongated recessed portion (91) is provided with a cap (92). The shaft is provided with a pinion (93) which is pinned thereto. A pinion (94) is journaled on the shaft (96) adjacent to part 2 of the casing.

The shaft (96) is journaled in bearings formed in the cap (92) and in the part 2 of the casing and located below the shaft (b) supporting the end (97) of the shaft (96). The pinion (94) meshes with the pinion (95) which in turn meshes with the pinion (93). Wings (98) are made integral with the pinion (94) and extend outwardly therefrom. A large gear wheel (99) is journaled upon the shaft (96) adjacent to the inner face of the cap (92) and is provided with wings (100). To the upper portion of the cap (92) an intermediate pinion (101) is journaled on a suitable bolt (102) which meshes with the pinion (103) pinned upon the shaft (b) adjacent to the cap.

It will be observed that the gear wheel (99) transmits movement to the pinions (101 & 103). A sleeve (104) is slidably mounted on the shaft (96) having wings (105 & 106) made integral therewith and an annular groove (107) formed in the center portion thereof. A lever (108) is pivotally journaled by the pin (109) to the lower portion of the elongated recessed portion (91).

The upwardly extending free end portion (110) extends into the annular groove (107) of the sleeve (104) to reciprocate the sleeve upon the shaft (96), thereby throwing the wings (105) in and out of contact with the wings (98) formed on the pinion (94). When the wings (106) are brought in contact with the wings (100) increased or multiple speed is transmitted to the shaft (b).

When the wings (105) are brought in contact with the wings (98) formed on the pinion (94) the same speed is transmitted to the shaft (b) as is imparted to the operating lever (71) as the pinions transmitting the movement of the shaft (b) are of the same size. When it is desired to cast the line from the spool independent of the high or low speed mechanism, the lever (108) is thrown to its central position as shown in the drawing. This disengages the wings to the sleeve from the high and low speed gearing and permits the spool to rotate independent of the high or low speed mechanism. The sleeve (104) is provided with keys extending from the inner periphery at points diametrically opposed to each other and engaging slots formed on the shaft (96) at points diametrically opposed to each other in the same manner as heretofore described and shown in Figs. 4 and 5.

The parts of the mechanism of the modification not herein specifically described are constructed in the same manner and perform the same functions in both devices.

Reference letters (c and d) designate outwardly extending pins used to rotate the cam.

Reference letters (e & f) represent the pole and handle respectively.

Having fully described my invention, what I claim, and desire to secure by Letters Patent, is 1. In a fishing reel comprising a casing, a spool, an axis fitted thereto, a tubular shaft rotatably supported by said axis, a rod loosely journaled in said tubular shaft, a winged clutch slidably fitted to said tubular shaft, a cap fitted to the casing having a hub formed thereon, an internal gear journaled in the hub of the cap, an operating lever secured to the hub of the internal gear, means to impart increased speed to the spool through the medium of said internal gear without increasing the speed of the operating lever.

2. A fishing reel comprising a casing, a spool, an axis fitted to said spool with the ends chamfered and extending on each side of said spool, ball bearing races secured to the casing providing bearings for the ends of the axis, a tubular shaft fitted in said axis, a shifting rod slidably fitted in the tubular shaft, a winged clutch mounted on said shaft, a socket secured to one end of the shifting rod, means to adjustably connect the shifting rod to the winged clutch, a projecting portion formed on the casing having a slot formed therein, a pin secured to said socket engaging with a slot formed in the projecting portion, a cam provided with an angular slot fitted to the projecting portion, said slot meshing with the slot in the projecting portion whereby the shifting rod is reciprocated when the cam is rotated.

3. A reel comprising a casing, a spool, an axis fitted to said spool having an aperture provided in the center, a tubular shaft fitted to said aperture, ball bearings fitted to the casing to provide bearings for said axis, a shifting rod fitted to reciprocate within the tubular shaft, a sliding double winged clutch mounted upon the tubular shaft, a pinion mounted on the tubular shaft having a winged clutch made integral therewith, a cap fitted to one side of the casing having a hub formed thereon, an internal gear journaled in the hub of said cap, a pinion arranged to intermesh with the internal gear and pinion on the shaft to transmit motion to the spool.

4. A reel comprising a casing, a spool, an axis having the ends thereof chamfered fitted to said spool, ball-bearings provided in the casing and adapted to rotatably support said spool, a tubular shaft rotatably supported by said axis, a pinion having wings formed thereon and journaled on said tubular shaft, a winged clutch slidably mounted on said tubular shaft, a cap with a hub formed integral fitted to one side of the casing, an internal gear having a hub journaled in the hub of the cap, wings made integral with the internal gear and adapted to engage with wings on one side of the winged clutch.

5. A reel comprising a casing, a tubular axis, a spool mounted thereon and secured to said axis, a tubular shaft fitted to the inner periphery of the axis, a winged clutch slidably mounted on the tubular shaft, a shifting rod slidably journaled in said tubular shaft, a socket fitted to said rod, an annular projecting portion extending from one side of the casing having a slot formed therein, a pin secured to said socket, a cam having an angular slot fitted to the outer periphery of the projecting portion; said pin passing through both slots thereby imparting a reciprocating movement to the shifting rod when the cam is partially rotated.

6. A reel comprising a casing, an axis journaled in said casing, a spool mounted on and connected thereto, a tubular shaft journaled in said axis, a shifting rod slidably fitted in said tubular shaft, a pinion mounted on the tubular shaft, a pinion secured to the casing meshing with the pinion mounted on the tubular shaft, a cap having a hub secured to the casing, an internal gear wheel journaled in the hub of said cap, an annular series of perforations provided in the spool, a spring actuated pin secured to the casing in the path of said perforations, and adapted to register therewith and lock the spool.

7. A reel comprising a casing, an axis journaled in said casing, a spool mounted on and connected to said axis, a tubular shaft journaled in said axis, a shifting rod slidably fitted to said tubular shaft, pinions secured to the casing, a cap, an internal gear wheel having a hub formed thereon journaled to said cap, an enlarged portion formed on one end of the shifting rod, a socket surrounding said enlarged portion, a pin secured to said socket, an annular tubular projecting portion extending from one side of the casing with a longitudinal slot formed therein, a cam provided with an angular slot intersecting with the slot formed in the annular projecting portion, a modified annular rack formed on one side of the spool, a spring actuated pin secured to one side of the casing in the path of the annular rack and adapted to mesh or contact therewith.

8. In a fishing reel a casing provided with ball bearings, an axis having chamfered ends adapted to be journaled in said bearings, a spool mounted on said axis and connected thereto, a tubular shaft rotatably supported by said axis, a sleeve having wings formed thereon slidably mounted on said tubular shaft, a shifting rod slidably supported by said tubular shaft, a socket secured to one end of the shifting rod and adapted to be reciprocated therewith, means to connect the sliding sleeve with the shifting rod, a pinion having wings thereon mounted on the tubular shaft, a cap having a hub formed thereon, an internal gear having a hub journaled in the hub of said cap, pinions secured to one side of the casing one meshing with the pinion mounted on the tubular shaft and the other meshing with the internal gear, wings or lugs secured to the inner periphery of one end of the internal gear.

9. A reel comprising a casing, an axis journaled to said casing, a tubular shaft supported by said axis, a spool mounted upon said axis, a shifting rod slidably supported by said tubular shaft, means to reciprocate the shifting rod.

10. A fishing reel, comprising a casing with ball bearings, an axis supported by said bearings, a spool mounted thereon, a tubular shaft rotatably supported by said axis, a sliding sleeve having wings formed thereon journaled upon said tubular shaft, a shifting rod slidably supported by said tubular shaft, a cap secured to the casing, an internal gear journaled by said cap, a pinion intermeshing with said internal gear, an intermediate pinion, a pinion loosely mounted on the tubular shaft meshing with the intermediate pinion.

11. A fishing reel comprising a casing, a spool, an axis secured to said spool, a tubular shaft journaled in said axis, an annular projecting portion having a slot formed therein extending from one side of the casing, a shifting rod slidably supported by said axis, a cam mounted upon a projecting portion of the casing, ball bearings secured to the casing, an adjustable cage for one of said bearings, means to adjust said cage to bring the balls journaled in the cage in contact with the chamfered ends of the axis for the purpose set forth and described.

12. A fishing reel comprising a two-part casing, an axis, a spool mounted on said axis, a tubular shaft supported by said axis, a shifting rod slidably journaled in said shaft, suitable mechanism to reciprocate said shifting rod.

In testimony whereof I, affix my signature in presence of two witnesses.

FRANK SCHREIDT.

Witnesses:
 JOHN H. COSS,
 PEARL ACKERMAN.